(12) United States Patent
White et al.

(10) Patent No.: US 7,229,129 B2
(45) Date of Patent: *Jun. 12, 2007

(54) VENTILATED SEAT

(75) Inventors: Brennon L. White, Commerce, MI (US); Mary J. Lumbard, Dexter, MI (US); Anne P. Liss, Livonia, MI (US); William G. Reed, Walled Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/258,645

(22) Filed: Oct. 26, 2005

(65) Prior Publication Data

US 2006/0103183 A1    May 18, 2006

Related U.S. Application Data

(63) Continuation of application No. 09/755,505, filed on Jan. 5, 2001, now Pat. No. 7,040,710.

(51) Int. Cl.
*A47C 7/74* (2006.01)

(52) U.S. Cl. .............................. 297/180.12; 297/180.1; 297/180.13; 297/180.14

(58) Field of Classification Search ............. 297/180.1, 297/180.12, 180.13, 180.14
See application file for complete search history.

(56) References Cited

U.S. PATENT DOCUMENTS

| | | |
|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,593,066 A | 7/1926 | Gaston |
| 1,664,636 A | 4/1928 | Mayer |
| 1,811,829 A | 6/1931 | Folberth et al. |
| 1,837,515 A | 12/1931 | Bachrach |
| 1,936,960 A | 11/1933 | Bowman |
| 2,012,042 A | 8/1935 | Gerlofson et al. |
| 2,022,959 A | 12/1935 | Gordon |
| 2,103,553 A | 12/1937 | Reynolds |
| 2,141,271 A | 12/1938 | Gertofson |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |

(Continued)

FOREIGN PATENT DOCUMENTS

DE    2 136 947    2/1973

(Continued)

*Primary Examiner*—Rodney B. White
(74) *Attorney, Agent, or Firm*—Foley & Lardner LLP

(57) ABSTRACT

A ventilated seat assembly including a trim cover, an enclosed chamber, a spacer, and a cushion is disclosed. The enclosed chamber is formed by a top portion and an air-impermeable bottom portion and includes an opening for receiving air from an air mover. The top portion includes a plurality of holes configured to provide air movement through the chamber. The spacer is located within the chamber.

12 Claims, 3 Drawing Sheets

U.S. PATENT DOCUMENTS

| | | |
|---|---|---|
| 2,722,266 A | 11/1955 | Kersten |
| 2,726,688 A | 12/1955 | Chessey |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman |
| 2,992,605 A | 8/1961 | Trotman et al. |
| 3,030,145 A | 4/1962 | Kottemann |
| 3,097,505 A | 7/1963 | Smith |
| 3,101,037 A | 8/1963 | Taylor |
| 3,101,660 A | 8/1963 | Taylor |
| 3,131,967 A | 5/1964 | Spaulding |
| 3,136,577 A | 6/1964 | Richard |
| 3,137,523 A | 6/1964 | Karner |
| 3,144,270 A | 8/1964 | Bilancia |
| 3,298,046 A | 1/1967 | Clementi et al. |
| 3,381,999 A | 5/1968 | Steere, Jr. |
| 3,486,177 A | 12/1969 | Marshack |
| 3,506,308 A | 4/1970 | Fenton |
| 3,529,310 A | 9/1970 | Olmo |
| 3,605,145 A | 9/1971 | Graebe |
| 3,628,829 A | 12/1971 | Heilig |
| 3,638,255 A | 2/1972 | Sterrett |
| 3,681,797 A | 8/1972 | Messner |
| 3,732,944 A | 5/1973 | Kendall |
| 3,736,022 A | 5/1973 | Radke |
| 3,757,366 A | 9/1973 | Sacher |
| 3,770,318 A | 11/1973 | Fenton |
| 3,778,851 A * | 12/1973 | Howorth ............ 297/180.13 X |
| 3,948,246 A | 4/1976 | Jenkins |
| 3,974,532 A | 8/1976 | Ecchuya |
| 3,987,507 A | 10/1976 | Hall |
| 4,002,108 A | 1/1977 | Drori |
| 4,008,498 A | 2/1977 | Thomas |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,143,916 A | 3/1979 | Trotman et al. |
| 4,149,285 A | 4/1979 | Stanton |
| 4,175,297 A | 11/1979 | Robbins et al. |
| 4,259,896 A | 4/1981 | Hayashi et al. |
| 4,391,009 A * | 7/1983 | Schild et al. ....... 297/180.13 X |
| 4,413,857 A | 11/1983 | Hayashi |
| 4,509,792 A | 4/1985 | Wang |
| 4,522,447 A | 6/1985 | Snyder et al. |
| 4,589,656 A | 5/1986 | Baldwin |
| 4,629,253 A | 12/1986 | Williams |
| 4,671,567 A | 6/1987 | Frobose |
| 4,673,605 A | 6/1987 | Sias et al. |
| 4,685,727 A * | 8/1987 | Cremer et al. ......... 297/180.14 |
| 4,686,724 A | 8/1987 | Bedford |
| 4,712,832 A | 12/1987 | Antolini et al. |
| 4,719,764 A | 1/1988 | Cook |
| 4,729,598 A | 3/1988 | Hess |
| 4,847,933 A | 7/1989 | Bedford |
| 4,852,934 A | 8/1989 | Yasuda et al. |
| 4,853,992 A | 8/1989 | Yu |
| 4,866,800 A | 9/1989 | Bedford |
| 4,923,248 A * | 5/1990 | Feher ................ 297/180.13 X |
| 4,946,220 A | 8/1990 | Wyon et al. |
| 4,980,940 A | 1/1991 | Isshiki |
| 4,981,324 A | 1/1991 | Law |
| 4,997,230 A * | 3/1991 | Spitalnick .......... 297/180.13 X |
| 5,002,336 A | 3/1991 | Feher |
| 5,004,294 A | 4/1991 | Lin |
| 5,016,302 A | 5/1991 | Yu |
| 5,079,790 A | 1/1992 | Pouch |
| 5,102,189 A | 4/1992 | Saito et al. |
| 5,106,161 A | 4/1992 | Meiller |
| 5,138,851 A | 8/1992 | Mardikian |
| 5,160,517 A | 11/1992 | Hicks et al. |
| 5,163,737 A | 11/1992 | Navach et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A * | 4/1995 | Callerio ............ 297/180.14 X |
| 5,408,711 A | 4/1995 | McClelland |
| 5,411,318 A | 5/1995 | Law |
| 5,416,935 A | 5/1995 | Nieh |
| 5,450,894 A * | 9/1995 | Inoue et al. ......... 297/180.1 X |
| 5,522,106 A | 6/1996 | Harrison et al. |
| 5,544,942 A | 8/1996 | Khac et al. |
| 5,561,875 A | 10/1996 | Graebe |
| 5,590,428 A | 1/1997 | Roter |
| 5,597,200 A * | 1/1997 | Gregory et al. ........ 297/180.13 |
| 5,613,729 A | 3/1997 | Summer, Jr. |
| 5,613,730 A | 3/1997 | Buie et al. |
| 5,626,386 A * | 5/1997 | Lush ..................... 297/180.13 |
| 5,626,387 A | 5/1997 | Yeh |
| 5,640,728 A | 6/1997 | Graebe |
| 5,645,314 A | 7/1997 | Liou |
| 5,692,952 A | 12/1997 | Chih-Hung |
| 5,715,695 A * | 2/1998 | Lord ................... 297/180.1 X |
| 5,787,534 A | 8/1998 | Hargest et al. |
| 5,833,309 A | 11/1998 | Schmitz |
| 5,833,321 A | 11/1998 | Kim et al. |
| 5,850,648 A | 12/1998 | Morson |
| 5,902,014 A * | 5/1999 | Dinkel et al. ......... 297/180.1 X |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A * | 7/1999 | Ekman et al. ...... 297/180.14 X |
| 5,934,748 A * | 8/1999 | Faust et al. ............ 297/180.12 |
| 6,003,950 A | 12/1999 | Larsson |
| 6,019,420 A * | 2/2000 | Faust et al. ............ 297/180.14 |
| 6,048,024 A | 4/2000 | Wallman |
| 6,059,018 A | 5/2000 | Yoshinori et al. |
| 6,062,641 A | 5/2000 | Suzuki et al. |
| 6,068,332 A * | 5/2000 | Faust et al. ............ 297/180.13 |
| 6,109,688 A * | 8/2000 | Wurz et al. ............ 297/180.14 |
| 6,152,534 A | 11/2000 | Maeda et al. |
| 6,179,706 B1 | 1/2001 | Yoshinori et al. |
| 6,186,592 B1 | 2/2001 | Orizaris et al. |
| 6,189,966 B1 * | 2/2001 | Faust et al. ............ 297/180.14 |
| 6,189,967 B1 * | 2/2001 | Short .................... 297/180.14 |
| 6,196,627 B1 * | 3/2001 | Faust et al. ............ 297/180.14 |
| 6,206,465 B1 | 3/2001 | Faust et al. |
| 6,224,150 B1 | 5/2001 | Eksin et al. |
| 6,277,023 B1 | 8/2001 | Schwarz |
| 6,291,803 B1 * | 9/2001 | Fourrey ............ 297/180.12 X |
| 6,478,369 B1 * | 11/2002 | Aoki et al. ............ 297/180.13 |
| 6,481,801 B1 | 11/2002 | Schmale |
| 6,511,125 B1 * | 1/2003 | Gendron ........... 297/180.13 X |
| 6,541,737 B1 * | 4/2003 | Eksin et al. ........ 297/180.12 X |
| 6,546,578 B1 | 4/2003 | Steinmeier |
| 6,578,910 B2 | 6/2003 | Andersson et al. |
| 6,619,736 B2 | 9/2003 | Stowe et al. |

| | | | | | | |
|---|---|---|---|---|---|---|
| 6,619,737 B2 | 9/2003 | Kunkel et al. | | DE | 40 01 207 A1 | 1/1990 |
| 6,626,488 B2 | 9/2003 | Pfahler | | DE | 39 28 883 A1 | 3/1991 |
| 6,629,724 B2 * | 10/2003 | Ekern et al. ........ 297/180.14 X | | DE | 196 07 110 A1 | 8/1997 |
| 6,629,725 B1 | 10/2003 | Kunkel et al. | | DE | 197 36 951 A1 | 3/1999 |
| 6,676,207 B2 | 1/2004 | Rauh et al. | | DE | 198 10 936 A1 | 9/1999 |
| 6,786,541 B2 * | 9/2004 | Haupt et al. ............. 297/180.1 | | DE | 198 51 979 A1 | 5/2000 |
| 6,793,016 B2 | 9/2004 | Aoki et al. | | DE | 199 54 978 C1 | 1/2001 |
| 6,840,576 B2 * | 1/2005 | Ekern et al. ........... 297/180.14 | | DE | 100 01 314 A1 | 7/2001 |
| 6,869,140 B2 * | 3/2005 | White et al. ........... 297/180.13 | | DE | 200 02 540 U1 | 8/2001 |
| 6,928,829 B2 | 8/2005 | Kamiya et al. | | DE | 197 45 521 A1 | 12/2001 |
| 6,929,322 B2 | 8/2005 | Aoki et al. | | DE | 199 47 567 A1 | 1/2003 |
| 2001/0035669 A1 | 11/2001 | Andersson et al. | | EP | 0 345 806 A2 | 6/1989 |
| 2002/0003362 A1 | 1/2002 | Kunkel et al. | | EP | 0 936 105 A1 | 8/1999 |
| 2002/0096915 A1 | 7/2002 | Haupt et al. | | EP | 1 075 984 B1 | 2/2001 |
| 2002/0096931 A1 | 7/2002 | White et al. | | EP | 1 123 834 A1 | 8/2001 |
| 2002/0140258 A1 | 10/2002 | Ekern et al. | | EP | 1 086 852 B1 | 1/2004 |
| 2003/0039298 A1 | 2/2003 | Eriksson et al. | | FR | 1.266.925 | 6/1961 |
| 2003/0214160 A1 | 11/2003 | Brennan et al. | | FR | 2.630.056 A1 | 10/1989 |
| 2003/0230913 A1 | 12/2003 | Buss et al. | | FR | 2.686.299 A1 | 1/1992 |
| 2004/0189061 A1 | 9/2004 | Hartwich et al. | | GB | 2 076 648 | 12/1981 |
| 2005/0066505 A1 | 3/2005 | Iqgbal et al. | | JP | 52 062560 | 5/1977 |
| 2005/0070219 A1 | 3/2005 | Wollenhaupt et al. | | JP | 01 172012 | 6/1989 |
| 2005/0082885 A1 | 4/2005 | Thunissen et al. | | JP | 08 028797 | 2/1996 |
| 2005/0085968 A1 | 4/2005 | Panic | | WO | WO 96/05475 A1 | 2/1996 |
| 2005/0121966 A1 | 6/2005 | White et al. | | WO | WO 99/50090 | 10/1999 |
| 2005/0161986 A1 | 7/2005 | Brennan et al. | | WO | WO 01/05623 A1 | 6/2000 |
| 2005/0178755 A1 | 8/2005 | Ulbrich | | WO | WO 02/06914 A1 | 1/2002 |
| 2005/0243331 A1 | 11/2005 | Ishima et al. | | WO | WO 03/011633 A1 | 7/2002 |
| | | | | WO | WO 03/051666 A1 | 12/2002 |
| | | | | WO | WO 2004/089689 A1 | 10/2004 |
| | | | | WO | WO 2005/73021 A2 | 8/2005 |

FOREIGN PATENT DOCUMENTS

| | | |
|---|---|---|
| DE | 28 25 597 | 12/1978 |
| DE | 37 05 756 A1 | 10/1988 |

* cited by examiner

VENTILATED SEAT

CROSS-REFERENCE TO RELATED APPLICATIONS

This application is a continuation of U.S. patent application Ser. No. 09/755,505 entitled "Ventilated Seat" filed Jan. 5, 2001, now U.S. Pat. No. 7,040,710 B2 which is incorporated by reference herein.

BACKGROUND

The present invention relates generally to the art of vehicle seating and more particularly to ventilated seating wherein air may be drawn there through to enhance occupant comfort. More specifically, the present invention relates to a ventilated seating system which is easy to install into a seat in a single operation and which is easy to adapt to a wide variety of seating designs.

Many different types of ventilated seats are known to the art. They typically are designed to enhance occupant comfort by passing air through the covering of the seat or horizontally through the seat itself. In warm weather the air flow moves in the vicinity of the seat contacted by the occupant's body and assists in cooling and reducing sweating. In cold weather, ventilated seats can help warm the occupant if heated air is forced through the seat or the seat covering. It is known therefore, that air flow in ventilated seats can be in either direction.

It is also known that the air used in ventilated seats can be ambient air (i.e., air of the same temperature as the vehicle interior) or cooled or heated air. For example, a ventilated seat can be coupled to a vehicle's air conditioning system. In addition, known ventilated seating can include flow control to increase or decrease total air flow, as well as direction, such as by having low, medium and high flow settings.

Ventilated vehicle seating, while being known for some time, is not widely used in the industry and is usually an expensive option or standard equipment in luxury priced vehicles. One reason is cost of manufacture, and as noted in many of the patents provided with this application, ventilated seating systems can be complex in design and difficult to install. In many cases providing a ventilation feature becomes a dominant consideration in overall seat design and may force the seat manufacturer to compromise comfort or styling details. In most cases the ventilation components must be carefully located within the seat, and the duct work and air moving apparatus must be accounted for before the final layer of seat cushioning and trim is sewn to the other components. Increased time in assembly equates to increased cost for the manufacturer, the OEM and the ultimate customer. A ventilated seating system which works effectively and provides even air flow at the portions of the seat to be ventilated, and which is less costly to manufacture than prior art ventilated seats, would represent a substantial advance in this art.

SUMMARY

A primary feature of the present invention is to provide a ventilated seating system which overcomes one or more of the above-noted disadvantages of prior art ventilated seats.

Another feature of the present invention is to provide a ventilated seating system which is relatively inexpensive and which can be easily adapted to a variety of seat designs.

A different feature of the present invention is to provide a ventilated seating system which produces a substantially uniform air flow in all of the areas of the seat where ventilation is desired.

Yet another feature of the present invention is to provide a ventilated seating system which may include a heating layer to enhance occupant comfort during cold weather.

Another feature of the present invention is to provide a ventilated seating system, the performance of which is not impaired by heavy occupants.

How these and other features of the invention are accomplished, individually or in various combinations, will be described in the following detailed description of the preferred embodiment, taken in conjunction with the drawings. Generally, however, the features are provided in a ventilated seating system which is located beneath the trim (for example, perforated leather, cloth, etc.) and is installed at the plant of the seat manufacturer. The ventilated seating system includes a bag having upper and lower sheets of non-permeable material which prevent the passage of air except at locations determined by the manufacturer. Within the bag is a three dimensional, expanded spacer material, preferably one which includes upper and lower layers of netting and fibers located therebetween which are stiff and which extend between the upper and lower netting layers. Expanded plastics can also be used. The spacer material is sufficiently stiff to avoid blockage of air flow when the seat is occupied, even by heavy occupants. Holes are provided in the upper surface of the bag, and preferably the holes are provided in a pattern matching the contact area of the occupant. For example, the bag for a seat cushion may include holes arranged in a U-shape, while a seat back might include a linear array of holes extending from the lower part of the seat to the upper part. An air movement system (e.g., a fan or a duct coupled to the vehicle's air conditioning system) is coupled to the bag and hence to the air space created by the spacer material to cause air movement laterally, longitudinally and vertically through the spacer material. If the air movement system is in a suction mode, air is drawn through the holes, into the spacer material and out of the bag. In a pressurization mode, air is forced into the bag and outwardly through the holes. The features of the present invention are also accomplished by altering the hole sizes so that holes nearer the air flow entrance or exit are smaller, thereby equalizing the amount of air which passes through the holes. An optional heater pad may be employed as a layer between the seat trim layer and the upper layer of the bag, or heating may be accomplished by coupling the air mover to the vehicle forced air heating system. For cooling, ambient air may be used, or the fan may be coupled to the vehicle's air conditioning system. Other ways in which the features of the present invention are accomplished will become apparent to those skilled in the art after they have read the following detailed description of the preferred and alternate embodiments, such other ways also being deemed by the present inventors to be within the scope of the present invention if they fall within the scope of the claims which follow.

BRIEF DESCRIPTION OF THE DRAWINGS

In the following drawings like reference numerals are used to indicate like components.

FIG. 4 is a partial cross-sectional view of the cover taken generally along lines 4—4 of FIG. 1.

DETAILED DESCRIPTION

Before beginning the detailed description of the preferred and alternate embodiments, several general comments can be made about the applicability and the scope of the present invention.

Figure 2:
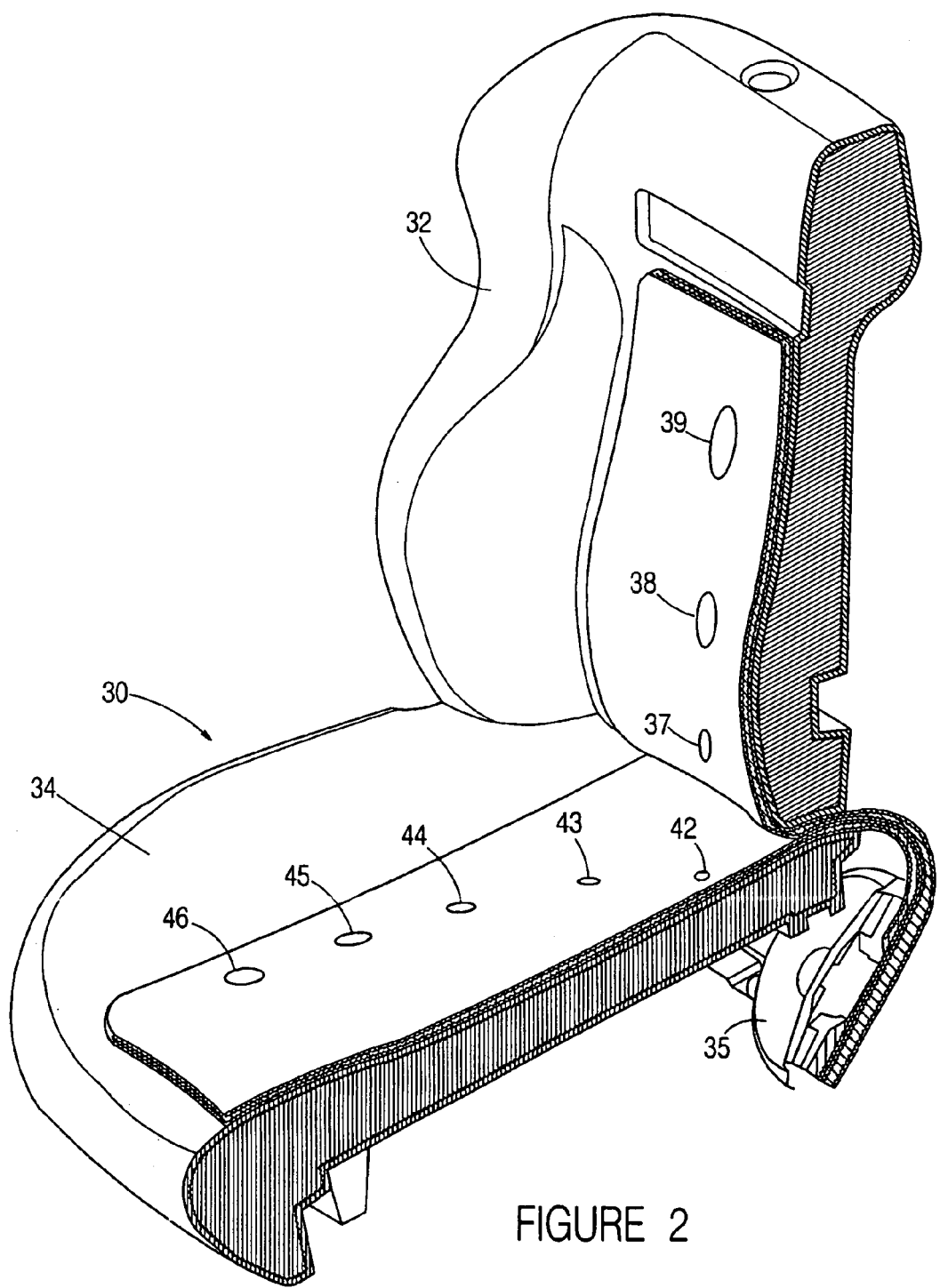
FIG. 2 is a perspective, schematic view of the ventilated seating system of the present invention (with the upper trim and the optional heating layer removed) showing the placement of two ventilated seating bags on the cushion and seatback and illustrating the coupling thereof to a single fan.

First, the ventilated seating system of this invention can be used with a wide variety of seats, including the sport or bucket type seat illustrated in FIG. 2 or in bench seating. For the latter, the ventilation system may be occupant selective, i.e., may have separate controls for different portions of the same seat, or may have a single bag system with one control.

Second, the ventilated seating system of this invention is shown with an air-permeable optional heating pad over the upper layer of the bag and beneath the trim of the seat. Other ways of seat heating may be employed, such as coupling the air space within the bag to the vehicle's air heating system.

Third, it is preferable that the ventilated seating system of the present invention be sewn along with seat trim and cushioning components to enhance manufacturing efficiency. However, the bag may be assembled as a separate component and then placed in the seat and coupled to the fan as a separate unit. In this regard, it should be noted that cushioning and other comfort layers which are not illustrated or described in detail in the specification may be used. If cushion layers are placed over the top of the bag, they should be open pore to permit air to readily pass through them.

Fourth, the way in which the fan illustrated in the drawings is coupled to sources of cooled, heated or ambient air is not shown in detail, but if it is desired to couple the fan to either the air cooling system of the vehicle or to the vehicle's air heating system, conventional duct work used in the vehicle manufacturing field may be employed to convey temperature modified air from the source to the fan.

Fifth, with the exception of the spacer material, which is located within the air-impermeable bag, the materials used for constructing the trim, heater pad and the bag itself may be selected from a wide range of materials. For the trim, air-permeable materials should be selected, such as cloth or perforated leather, but the thickness, color, etc., may be widely varied. Other spacer materials, such as expanded plastics, can be employed within the air-impermeable bag, so long as air flow is permitted to occur in any direction, i.e., longitudinally, laterally, or vertically within the spacer material itself. The preferred spacer material to be used herein is a series 5900 spacer material manufactured by Mueller Textile of Wiehl, Germany. This material, in addition to providing air distribution benefits, also provides comfort benefits and includes an upper netting layer, a lower netting layer and a plurality of stiffened resin fibers extending between the netting layers. It may deform slightly when an occupant sits on the seat, but the material is sufficiently resilient that it will not be crushed to the point the air flow is blocked, thereby impairing the effectiveness of the seat ventilation. In the preferred embodiment, the upper layer of the bag is made of a dual layer material having a first lower layer consisting of an air-impermeable resin film, over which is placed a thin foam layer. A suitable material is Pladilon™ material, manufactured by Foamex International, Inc., of Southfield, Mich., U.S.A.

Figure 1:
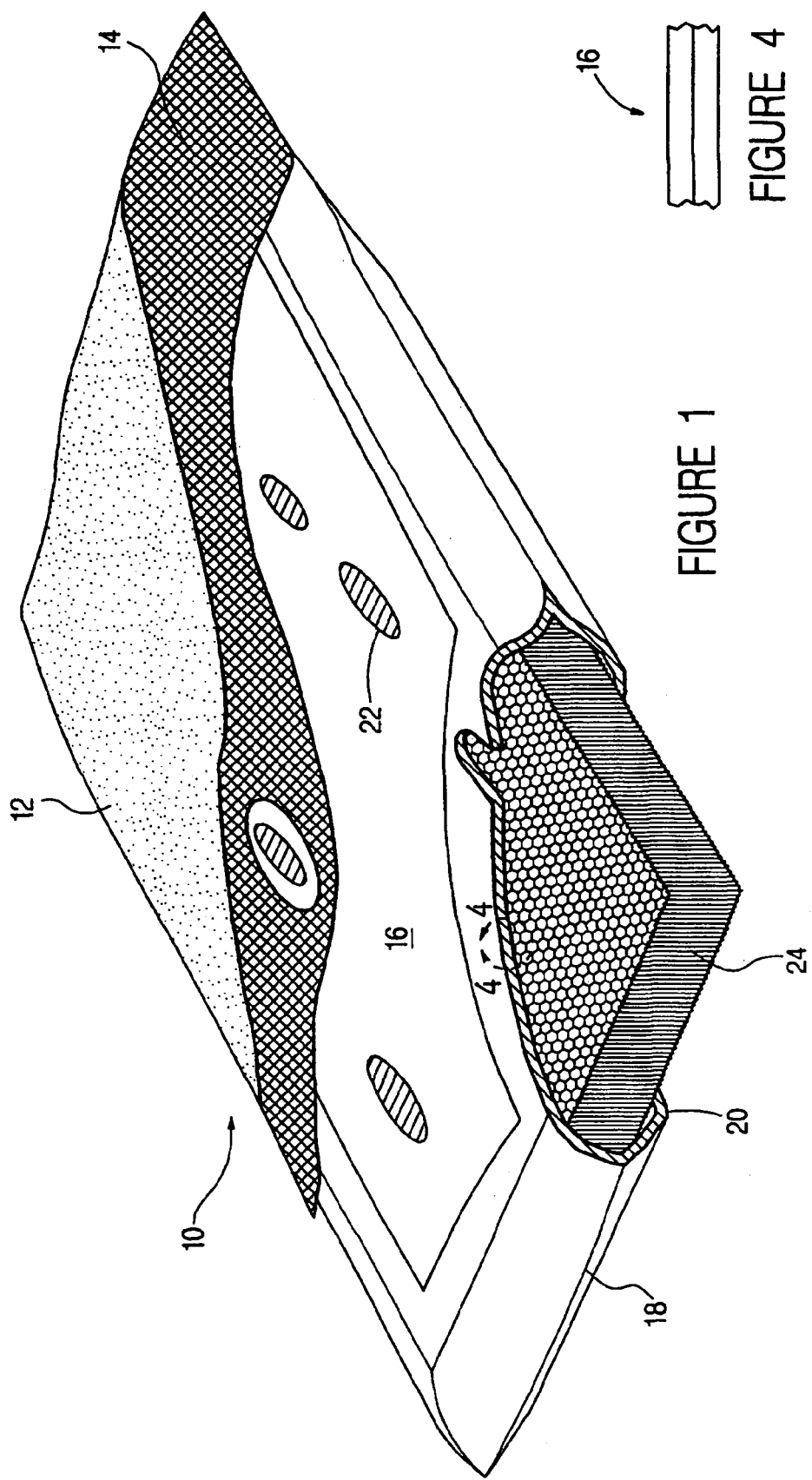
FIG. 1 is a perspective, schematic view, with portions broken away, showing the main components of the ventilated seating system according to one preferred embodiment of the present invention.

Proceeding now to a description of the preferred embodiment, FIG. 1 shows in schematic form with portions cut away, a ventilated seat assembly 10 according to the preferred embodiment of the present invention. Assembly 10 includes a number of different layers which, in various aspects of the invention can be varied and/or eliminated as mentioned above. The upper layer of seat assembly 10 is the perforated trim which preferably is cloth or perforated leather. Located beneath the trim 12 is an air-permeable heater layer 14. Located beneath heater layer 14 is the top layer 16 of a bag 18. The bottom 20 of bag 18 is also shown in this Figure, as is the joining of the top 16 and bottom 20 to form an air-impermeable bag, except for a plurality of holes 22 formed in the bag top 16. It can be noted in FIG. 1 that a hole can be formed in the heater pad 14, but if the heater pad material is air permeable, it is not necessary to do so. It will also be noted in FIG. 1 that the size of the holes 22 located near the lower portion of the FIGURE are larger than holes nearer the heater pad 14. More will be said in this regard later.

The final component of assembly 10, as shown in FIG. 1, is a spacer material 24. As indicated earlier, the preferred spacer material is the Mueller Textile material which includes an upper netting layer, a lower netting layer and a plurality of fibers extending between them. This material has sufficient resiliency to prevent crushing of spacer layer 24 when an occupant sits on or leans back against a ventilated seat assembly 10.

FIG. 2 illustrates the use of two bags attached to a seat 30 comprised of a seatback 32 and a seat cushion or seat base 34. One bag 10 resides along the center area of the seatback 32, while another bag is located at the center portion of the cushion 34. The bags each extend through the bite line of the seat and the bag impermeable layers are suitably coupled to a fan 35 located below the bite line.

FIG. 2 also illustrates in greater detail the aspect of the preferred embodiment of the present invention which varies the size of the holes 22 as the distance from the air mover increases. In this Figure, three openings are provided in the bag extending up the backrest 32 with holes 37, 38 and 39 becoming gradually larger as the distance from fan 35 increases. A linear pattern is provided for these holes, as that pattern has been found to be acceptable for the heating or cooling of an occupant. The bag located on the cushion 34 also includes a pattern of openings 22, this time the openings being provided in a U-shape to rest under the legs and seat of the occupant. The opening 42 at the bottom of the "U" is the smallest and sets of openings 43, 44, 45, and 46 extend in a spaced relationship toward the front of the bag and grow gradually larger. This size and arrangement of the air holes, with the smaller holes being near the air mover, contributes to a more uniform flow of air from the air mover, in this case fan 35. It should be understood however, that the hole sizes may be the same without departure from the scope of this invention.

Figure 3:
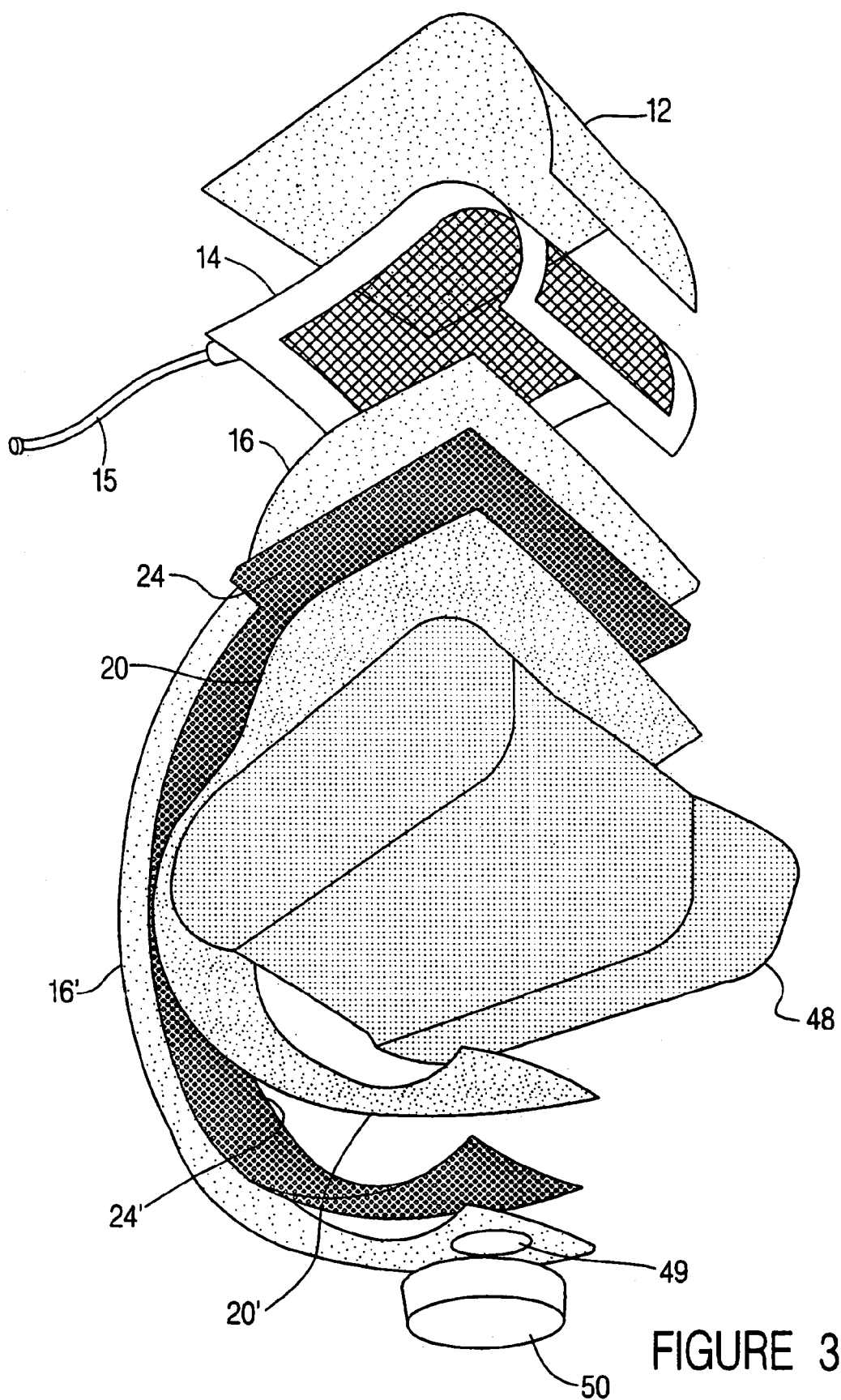
FIG. 3 is an exploded view of the major components of the present invention.

Proceeding next to FIG. 3, a more detailed, exploded view of a single bag (along with other components of assembly 10) is shown. The same reference numerals will be used as were used in connection with FIG. 1 for the various layers. Proceeding from the top, the perforated trim layer 12 is shown above the heater layer 14 (and in this case, the electrical coupling through wires 15 is shown). The bag top 16 is located beneath the heater and the spacer material 24 is then provided. Bottom 20 of the bag completes the assembly on a seat cushion 48.

In FIG. 3, each of the bag top 16, spacer 24 and bag bottom 20 include elongate tails marked with the same reference number with a prime sign (e.g. 16'). In the illustrated embodiment, these extend through the seat bite line and an opening 49 is provided in the material forming the bag top 16. In this Figure, a fan 50 acts as the air mover and is coupled to opening 49. Depending on the seat style and location, the tail may extend forwardly or to the side.

In use, the system illustrated in FIG. 3 is preferably sewn to the seat at the same time trim 12 is attached. Components 12, 14, 16 and 20 can be sewn together, the sewing of the latter two forming a portion of the seal extending about bag 18. Components 16' and 20' would be sewn along their edges to maintain the air-impermeability in that area. The attachment of the fan itself could be made in any suitable manner, such as by using an adhesive or the like. It is also easy to understand by reference to FIG. 3 how other air moving systems could be employed for the ventilated seat of the present invention. For example, a duct extending from the vehicle's air conditioning system could have its end coupled in a sealed relationship to opening 49 to allow heated or cooled air to pass along the spacer to the holes (not shown in this Figure) and the bag top 16. It can also be mentioned again here that the speed and direction of air movement can be controlled by a separate controller coupled to the air mover 50 or by using the fan speed and temperature controls of the vehicle. If a fan 50 is used which is not directly coupled to the vehicle's air conditioning system, it is preferred that the fan be reversible to operate in a pressurizing or suction mode and that the fan be multi-speed, i.e., having at least low, medium and high settings.

While the present invention has been described in connection with a preferred and then an alternate embodiment, the present invention is not to be limited thereby but is to be limited solely by the scope of the claims which follow.

What is claimed is:

1. A ventilated seat assembly for use with an air mover comprising:
    a seat having a seat base and a backrest, at least one of the seat base and the backrest comprising:
    a cushion;
    a trim cover;
    a generally enclosed chamber formed by a top portion and an air-impermeable bottom portion and including an opening for receiving air from the air mover, the top portion of the chamber including a plurality of holes configured to provide air movement through the chamber; and
    a spacer located within the chamber;
    wherein each of the plurality of holes has a cross-sectional area, the holes located substantially the same distance from the chamber opening defining a group having a total cross-sectional area, the top portion of the chamber including more than one group of holes, with the total cross-sectional area of each defined group of holes increasing the farther each defined group of holes is from the chamber opening.

2. The ventilated seat assembly of claim 1, wherein the trim cover and the top portion of the chamber are separate elements.

3. The ventilated seat assembly of claim 1, wherein the bottom portion of the chamber and the cushion are separate elements.

4. The ventilated seat assembly of claim 1, further comprising a heater for raising the temperature of the air exiting the ventilated seat, the heater positioned beneath the trim cover.

5. The ventilated seat assembly of claim 4, wherein the top portion of the chamber and the heater are separate elements.

6. The ventilated seat assembly of claim 1, wherein each of the seat base and the backrest comprises a cushion, a trim cover, a chamber, and a spacer.

7. The ventilated seat assembly of claim 6, wherein the chamber in the seat base and the chamber in the backrest are configured to receive air from a single air mover.

8. A ventilated seat assembly comprising:
    a seat having a seat base and a backrest, at least one of the seat base and the backrest comprising:
    a cushion;
    a generally enclosed bag including a top portion and an air-impermeable bottom portion, the top portion of the bag including a plurality of holes for providing air movement through the bag;
    a spacer located within the bag;
    an air mover spaced apart from the bag;
    an elongate tail extending between the bag and the air mover, the elongate tail being formed from an extension of the top portion of the bag and an extension of the bottom portion of the bag and including an opening coupled to the air mover; and
    a trim cover extending around at least a portion of the cushion and the bag.

9. The ventilated seat assembly of claim 8, wherein each of the seat base and the backrest comprises a cushion, a bag, a spacer, an elongate tail, and a trim cover.

10. The ventilated seat assembly of claim 9, wherein the elongate tail of the seat base and the elongate tail of the backrest are coupled to the same air mover.

11. The ventilated seat assembly of claim 8, wherein the air mover is located on the opposite side of the cushion as the bag.

12. The ventilated seat assembly of claim 11, wherein the elongate tail extends between the bag and the air mover on the outside of the cushion.

* * * * *